United States Patent Office 3,053,712
Patented Sept. 11, 1962

3,053,712
RUBBER BONDING AGENTS
Thomas S. Grabowski, Gary, Ind., assignor to Borg-Warner Corporation, Chicago, Ill., a corporation of Illinois
No Drawing. Filed Oct. 10, 1957, Ser. No. 689,260
6 Claims. (Cl. 154—43)

This invention relates to new and improved elastomer bonding agents and methods for the employment thereof. More particularly, this invention relates to new and improved rubber bonding agents and methods for the employment thereof. In one specific aspect thereof, this invention relates to new and improved compositions for the bonding of rubber to metal and methods for the employment thereof.

In many manufacturing processes it is necessary to bond an elastomer either to itself or to a different material. Thus, it is frequently necessary to bond a rubber stock to another rubber stock of the same type or of a different type. Also, it is frequently necessary to bond a rubber stock to a textile material, a metal, or the like. Different types of rubbers exhibit wide variations in the ease with which they may be bonded to themselves and particularly to non-rubber surfaces. Thus, in general, butadiene-acrylonitrile copolymer rubbers (Perbunans) and polychlorobutadiene (polychloroprene) rubbers (neoprenes) are comparatively easy to bond, both to themselves and to surfaces of an entirely different type. Synthetic rubbers of this type can be satisfactorily bonded with adhesives of the more or less classical type such as phenolic resins, epoxy resins, isocyanates, and the like.

The situation is quite different when natural rubbers, butadiene-styrene copolymer rubbers (GRS types) and isobutene-isoprene copolymer rubbers (Butyls) are involved. (Hereinafter, rubbers of these types will be generically designated "polyhydrocarbon type rubbers.") Adhesives of the nature previously enumerated do not wet the surfaces of such elastomers well and are incapable of forming a satisfactory bond, either of the elastomer to elastomer type or a bond between the elastomer and a surface of a different type. Resins of certain types, for example, butadiene-styrene copolymer resins, coumarone-indene resins, polystyrene, polyethylene, etc., are capable of wetting the surfaces of natural rubbers, GRS rubbers and Butyl rubbers but such resins are incapable of producing a satisfactory elastomer bond, either of the elastomer to elastomer type or a bond between the elastomer and a surface of a different type.

To form a satistfactory bond involving an elastomer of the type exemplified by natural rubbers, GRS type rubbers and Butyl rubbers, it is necessary to employ a bonding agent which is capable of wetting the surface of the elastomer and which contains a chemical bridging agent capable of reacting, under the usual conditions of cure, with both the bonding agent and the surface of the elastomer in question to produce a firm chemical bridge across the interface between the two materials, resulting in the formation of a firm and satisfactory bond. Obviously, in producing elastomer to elastomer bonds two such chemically bridged interfaces are formed. Bonding agents capable of wetting natural rubbers, GRS type rubbers and Butyl rubbers will also wet other types of surfaces (e.g. metals) to which elastomers are frequently bonded and will give a strong and satisfactory bond at the metal/bonding agent interface even in the absence of a chemical bridging agent. However, it is obvious that in forming a bond between a metal surface (for example) and an elastomer of the polyhydrocarbon type it is essential that the bonding agent contain a chemical bridging agent in order to form a strong and satisfactory bond at the elastomer/bonding agent interface.

I have found that compositions comprising chlorinated rubber plus a dinitroso aromatic compound as a chemical bridging agent are excellent for bonding polyhydrocarbon type rubbers both to themselves and to surfaces of a different type. While the bonding agents of this invention are particularly useful in overcoming prior art difficulties encountered when attempting to bond polyhydrocarbon type rubbers to themselves and to surfaces of a different type, the utility of the compositions of this invention is not limited to such applications. The compositions of this invention form firm and satisfactory bonds in systems in which highly polar type rubbers are employed. Thus, the compositions of this invention form firm and satisfactory bonds in systems employing neoprene type rubbers, including neoprene/neoprene bonds and bonds between neoprene type rubbers and a surface of a different type. However, as has been mentioned previously, satisfactory bonds of these types can be obtained with simpler and less expensive bonding agents than those of the present invention.

One object of this invention is to provide a new and improved process for the bonding of elastomers to elastomers.

Another object of this invention is to provide a new and improved process for the bonding of elastomers to a surface of a different type.

An additional object of this invention is to provide a new and improved process for the bonding of elastomers to a metal surface.

A further object of this invention is to provide a new and improved process for the bonding of polyhydrocarbon type rubbers to polyhydrocarbon type rubbers.

One other object of this invention is to provide a new and improved process for the bonding of polyhydrocarbon type rubbers to a surface of a different type.

Yet another object of this invention is to provide a new and improved process for the bonding of polyhydrocarbon type rubbers to a metal surface.

An additional object of this invention is to provide new and improved compositions for the bonding of elastomers to elastomers.

A still further object of this invention is to provide new and improved compositions for the bonding of elastomers to a surface of a different type.

Another object of this invention is to provide new and improved compositions for the bonding of elastomers to a metal surface.

An additional object of this invention is to provide new and improved compositions for the bonding of polyhydrocarbon type rubbers to polyhydrocarbon type rubbers.

Yet a further object of this invention is to provide new and improved compositions for the bonding of polyhydrocarbon type rubbers to a surface of a different type.

Another object of this invention is to provide new and improved compositions for the bonding of polyhydrocarbon type rubbers to a metal surface.

Additional objects of this invention will become apparent as the description thereof proceeds.

For the more complete understanding of this invention, the following example is given setting forth a number of specific embodiments of compositions in accordance with this invention.

Example 1

The following compositions, suitable for accomplishing the objects of this invention, were prepared, the numerical values given in the body of the table being parts by weight.

| Formula | A | B | C | D | E | F | G | H | I |
|---|---|---|---|---|---|---|---|---|---|
| Parlon 5, cp | 1.0 | | | | | | | | |
| Parlon 20, cp | | 1.0 | | | | | | | |
| Parlon 125, cp | 4.0 | 4.0 | 4.0 | 4.0 | 4.0 | 4.0 | 4.0 | 3.0 | 4.0 |
| Alloprene B | | | 1.0 | 1.0 | 1.0 | 1.0 | 1.0 | 2.0 | 1.0 |
| p-Dinitrosobenzene | 0.6 | 0.6 | 0.6 | 0.6 | 0.6 | 0.6 | 0.6 | 0.6 | 0.6 |
| Dyphos | 0.25 | 0.25 | 0.25 | 0.25 | 0.25 | 0.25 | 0.25 | 0.25 | 0.25 |
| Spheron 9 | | 1.0 | | | 0.5 | 1.0 | 1.5 | 1.0 | |
| P-33 | | | | 0.5 | | | | | |
| Kosmos BB | | | | | | | | | 0.6 |
| Xylene | 20.0 | 20.0 | 20.0 | 20.0 | 20.0 | 20.0 | 20.0 | 20.0 | 20.0 |

In the above table, the Parlons are chlorinated natural rubbers (approximately 67% chlorine content), the designations 5 cp., 20 cp. and 125 cp. indicating the approximate viscosity (at 25° C.) in centipoises of a 20% w./w. solution of the particular resin in toluene (20 g. resin dissolved in 80 g. toluene). Actually, such solutions made from different batches of Parlon 5cp. show a range of viscosity extending from about 4 cp. to about 7 cp.; Parlon 20 cp. from about 15 cp. to about 23 cp. and Parlon 125 cp. from about 115 cp. to about 180 cp.

Alloprene B is also a chlorinated natural rubber containing about 65% chlorine. Solutions of different batches of Alloprene B in toluene (20% w./w.) exhibit viscosities at 25° C. ranging from about 14.5 cp. to about 31 cp. It is evident that Parlon 20 cp. and Alloprene B are essentially similar materials.

Chlorinated natural rubbers which produce 20% w./w. solutions in toluene exhibiting a viscosity of approximately 30 cp. or less at 25° C. are herein designated "low viscosity chlorinated rubbers," this term embracing such well known commercial products as Parlon 5 cp., Parlon 20 cp., Alloprene B and Alloprene A (viscosity range 9–12 cp.).

Chlorinated natural rubbers which produce 20% w./w. solutions in toluene exhibiting a viscosity of approximately 85 cp. or more at 25° C. are herein designated "high viscosity chlorinated rubbers," this term embracing such well know commercial products as Parlon 125 cp. and Alloprene D (viscosity range, 85–125 cp.).

Dyphos is dibasic lead phosphite and is employed to stabilize the chlorinated rubbers used in the compositions.

Speron 9, P–33 and Kosmos BB are well known brands of carbon black.

Any conveniently available aromatic dinitroso compound may be employed as the chemical bridging agent in the compositions of this invention. The p-dinitrosobenzene of the compositions of the table was prepared by classical procedures, involving the oxidation of p-benzoquinone dioxime with potassium ferricyanide in an alkaline medium.

Among other aromatic dinitroso compounds which may be used in the compositions of this invention may be mentioned p-dinitrosotoluene, 1,4-dinitrosonaphthalene (explodes at 120° C.) and 1,2-dinitrosonaphthalene. All three of these compounds may be prepared by the general reaction previously set forth. m-Dinitrosobenzene is obtained (along with some m-nitro nitroso benzene) by the reduction of m-dinitrobenzene with zinc dust and acetic acid in alcoholic medium.

Dinitroso derivatives of dihydric phenols are particularly easy to prepare by the action of nitrous acid on a dihydric phenol. Among derivatives that may be formed in this way are dinitrosoresorcinol (Fast green, Russian green, Alsace green), dinitrosoörcinol, dinitroso phloroglucinol monomethyl ether, and the like.

Any suitable solvent may be employed in the compositions of this invention but since aromatic solvents are highly effective and relatively inexpensive this class of solvent is preferred. Instead of the xylene employed as the solvent in the compositions of the table, hi-flash coal tar naphthas and high solvency naphthas from petroleum sources may be employed. Benzene and toluene are also suitable solvents but because of the comparatively high evaporation rate of these aromatics their use produces compositions which may be somewhat less satisfactory for application (as described subsequently) than compositions employing somewhat slower evaporating solvents.

Confining attention for the moment to the chlorinated rubber and solvent components of the compositions of the table, it will be noted that all these compositions are a 20% w./w. solution of the chlorinated rubbers in xylene. The viscosities of these solutions fall in the approximate range 70–120 cp. (at 25° C.). Since all of these solutions contain a small amount of Dyphos dispersed therein and most of them contain small to rather appreciable amounts of carbon black dispersed therein, the presence of these dispersed solids results in a higher apparent viscosity (consistency) than the Newtonian viscosities of the unpigmented chlorinated rubbers-xylene solutions.

The essential ingredients of the compositions of this invention are the chlorinated rubbers component and the dinitroso aromatic component. The solvent employed merely facilitates application of the compositions in the form of a uniform film to the surfaces to be bonded as will be evident from the description of the method of employment of the compositions to be presented subsequently. As is well known, chlorinated rubber, in common with most resinous and plastic materials of high chlorine content, exhibits a slight tendency to deteriorate on aging. Dibasic lead phosphite is used to enhance the environmental stability of the chlorinated rubbers component; stabilizers of other types conventionally employed in conjunction with plastic and resinous materials of high chlorine content (e.g. polyvinyl chloride) may replace a portion of all of the dibasic lead phosphite, or use of a stabilizer may be dispensed with completely if desired, this omission being accompanied by some sacrifice in the environmental stability of the chlorinated rubbers component. The carbon black is also not an essential ingredient of the compositions of this invention as is evident from Formula A of Example 1. The carbon black is employed principally to conform with established commercial formulation practices in the general field of rubber bonding agents and to give "body" to the compositions.

Confining attention for the moment to the essential chlorinated rubbers and dinitroso aromatic components of the compositions of this invention, it will be noted that the compositions of Example 1 contain approximately 90% by weight chlorinated rubbers and approximately 10% by weight of the dinitroso aromatic compound, based on the total weight of these components. As would be expected, compositions suitable for accomplishing the objects of this invention are not confined to this particular ratio of these two essential ingredients. Compositions suitable for accomplishing the objects of this invention may contain from about 85% to about 98% by weight of chlorinated rubbers and correspondingly from about 15% to about 2% by weight of the dinitroso aromatic component on a 100% total basis for these two essential ingredients.

The rubber bonding agents of this invention are employed in accordance with procedures well known to those skilled in the art. When it is desired to make a rubber to rubber bond, the two surfaces to be bonded are cleaned (if necessary) and a film of a composition of this invention is applied to one or both of the surfaces to be bonded. After the applied film has been allowed to air dry for a short time, the two surfaces to be bonded are brought into intimate contact and the resulting assembly is cured under conditions of time and temperature appropriate to the rubber stock involved. A generally similar procedure is employed when it is desired to bond rubber to a textile or a similar surface or to a metallic surface. When rubber to metal bonding is involved it is usually more convenient to apply a film of the bonding agent to the metal surface only. The following examples are illustrative but non-limiting description of representative rubber to metal bonding operations employing bonding agents of this invention.

*Example 2*

A steel strip was thoroughly cleaned by degreasing and grit blasting and a film of the bonding agent set forth in Formula B of Example 1 was applied by brushing to the resulting clean and dry metal surface. The resulting film was allowed to air dry for twenty minutes following which a layer of freshly sheeted uncured natural rubber stock was pressed into intimate contact with the partially dried film of the bonding agent on the steel surface. The resulting assembly was then cured at 307° F. for 20 minutes. Twenty four hours after the curing operation, the "peel strength" of the resulting assembly was determined following the procedure of A.S.T.M. D-429-57T, Method B, which test procedure measures the force (expressed in pounds per inch) necessary to pull a rubber strip one inch wide from the steel. Examination of the test strip after this test showed that the peeling occurred entirely in the rubber stock, no bare metal and no part of the layer of bonding agent being exposed as the result of this test. Obviously, in these circumstances the peel strength was characteristic of the rubber stock itself.

*Example 3*

A steel strip was thoroughly cleaned by degreasing and grit blasting and a film of the bonding agent set forth in Formula D of Example 1 was applied to the resulting clean and dry surface by brushing. The resulting film was allowed to air dry for twenty minutes following which a layer of freshly sheeted uncured natural rubber stock was pressed into intimate contact with the partially dried film of the bonding agent on the steel surface. The resulting assembly was cured and the cured assembly was tested as described in Example 2. The "peel strength" of the assembly (average of two determinations) was 106 pounds per inch and 93% of the resulting break occurred through the rubber stock.

*Example 4*

The procedure of Example 3 was followed with the exception that freshly sheeted, uncured Butyl rubber was employed. The steel-Butyl rubber assembly was cured under time and temperature conditions conventionally employed with Butyl rubber. The "peel strength" was 74 and 76 pounds per inch (two determinations) and 95% of the resulting breaks occurred through the Butyl rubber stock.

Similar results were obtained in testing strips prepared by bonding other polyhydrocarbon type rubbers to steel, using various compositions prepared in accordance with this invention. The bond strengths at the metal/bonding agent interface and at the bonding agent/rubber interface were both greater than the cohesive forces in the rubber stocks themselves and accordingly failure in this test occurred largely or exclusively through the rubber stock.

*Example 5*

As mentioned previously, the bonding agents of this invention also are effective with polar type rubbers. In this example the general procedure of Example 2 was followed but a neoprene rubber stock was employed in conjunction with the bonding agent of Formula F, Example 1. The assembly was cured at 307° F. for 25 minutes. On testing the cured assembly as previously described, the peel strength measured was that characteristic of the rubber stock itself and failure occurred entirely through the rubber stock.

Be it remembered, that while this invention has been described in connection with specific details and specific embodiments thereof, these are illustrative only and are not to be considered limitations on the spirit or scope of the said invention except insofar as these may be incorporated in the appended claims.

I claim:
1. The composition of matter comprising a solution of chlorinated natural rubber of approximately 65%–67% chlorine content and a dinitroso aromatic compound in an aromatic solvent, the chlorinated rubber representing from about 85% to about 98% and the dinitroso aromatic compound representing from about 15% to about 2% of the total weight of these two solutes.
2. The composition of claim 1, further characterized by the fact that the dinitroso aromatic compound is p-dinitrosobenzene.
3. The composition of claim 1, further characterized by the fact that carbon black is dispersed therein.
4. The composition of claim 1, further characterized by the fact that a stabilizing amount of dibasic lead phosphite is present for stabilizing the chlorinated natural rubber and the dinitroso aromatic compound is p-dinitrosobenzene.
5. The composition of claim 1, further characterized by the fact that a stabilizing amount of dibasic lead phosphite is present for stabilizing the chlorinated natural rubber, the dinitroso aromatic compound is p-dinitrosobenzene and carbon black is dispersed therein.
6. The method of bonding a rubber body selected from the group consisting of uncured natural, uncured polychloroprene and uncured butyl rubbers to a metal body comprising the steps of applying an adhesive film, comprising as its essential ingredients chlorinated natural rubber of approximately 65% to 67% chlorine content and a dinitroso aromatic compound in an aromatic solvent, said chlorinated rubber representing from about 85% to about 98% and the dinitroso aromatic compound representing 15% to about 2% based on the total weight of the two essential ingredients in the adhesive film, to at least one of said bodies, and heating the resulting assembly to cure the uncured rubber and to bond said rubber to said metal body.

References Cited in the file of this patent

UNITED STATES PATENTS

| | | |
|---|---|---|
| 2,259,190 | Winklemann | Oct. 14, 1941 |
| 2,459,742 | Bradley | Jan. 18, 1949 |
| 2,476,829 | Le Claire | July 19, 1949 |
| 2,540,596 | Rehner | Feb. 6, 1951 |
| 2,637,751 | Brooks | May 5, 1953 |
| 2,835,624 | Cousins | May 20, 1958 |
| 2,866,731 | Van Epps | Dec. 30, 1958 |

OTHER REFERENCES

Barrow et al.: Jour. Chemical Society (vol. 119), pages 212–16 (1921). (Copy in Scientific Library.)

Disclaimer 3,053,712.—*Thomas S. Grabowski*, Gary, Ind. RUBBER BONDING AGENTS. Patent dated Sept. 11, 1962. Disclaimer filed Nov. 29, 1963, by the assignee, *Borg-Warner Corporation*.

Hereby enters this disclaimer to claims 1 to 6, inclusive, of said patent.

[*Official Gazette February 11, 1964.*]